United States Patent

Shimizu et al.

[11] Patent Number: 5,631,529
[45] Date of Patent: May 20, 1997

[54] ELECTRIC POWER STEERING

[75] Inventors: Yasuo Shimizu; Yashito Nakamura; Yoshiki Noro, all of Wako, Japan

[73] Assignee: Honda Giken Kogyo Kabushiki Kaisha, Tokyo, Japan

[21] Appl. No.: 456,527

[22] Filed: Jun. 1, 1995

[30] Foreign Application Priority Data

Jun. 6, 1994 [JP] Japan ................... 6-123854

[51] Int. Cl.$^6$ .................................... B62D 5/04
[52] U.S. Cl. .................. 318/432; 318/139; 318/430; 180/446
[58] Field of Search ............. 318/430–434, 318/139; 364/424.05, 424.02; 180/79.1, 142, 143, 141; 74/388 PS, 337; 388/821, 930

[56] References Cited

U.S. PATENT DOCUMENTS

| | | | |
|---|---|---|---|
| 4,538,698 | 9/1985 | Hashimoto et al. | 180/79.1 |
| 4,580,648 | 4/1986 | Murakami et al. | 180/79.1 |
| 4,753,310 | 6/1988 | Hashimoto | 180/79.1 |
| 4,785,901 | 11/1988 | Maeda | 180/142 |
| 4,800,975 | 1/1989 | Oshita et al. | 180/142 |
| 4,809,173 | 2/1989 | Fukami et al. | 364/424.05 |
| 4,869,333 | 9/1989 | Morishita et al. | 180/79.1 |
| 4,979,114 | 12/1990 | Oshita et al. | 364/424.05 |
| 5,053,966 | 10/1991 | Takahashi et al. | 364/424.05 |
| 5,198,981 | 3/1993 | Collier-Hallman et al. | 364/424.05 |
| 5,467,281 | 11/1995 | Iwashita et al. | 364/424.05 |
| 5,473,539 | 12/1995 | Shimizu et al. | 364/424.05 |
| 5,482,129 | 1/1996 | Shimizu | 180/79.1 |

*Primary Examiner*—Paul Ip
*Attorney, Agent, or Firm*—Armstrong, Westerman, Hattori, McLeland & Naughton

[57] ABSTRACT

An electric power steering apparatus provides a steering power assist of a motor to the steering system of an associated automotive vehicle, so as to reduce necessary steering power to be applied by a driver. The steering apparatus includes an attenuation device in the form of a phase delay circuit or an active low-pass filter, which is provided in a feedback loop connecting a motor current detector and a control section of a control unit constituting the vehicle steering system. By the attenuation device attenuating relatively high frequency components of motor current detected by the motor current detector, there is achieved a high-performance electric power steering apparatus which is capable of reducing noise in the feedback loop, without affecting the motor current, to a sufficient degree to highly improve a response to a driver's steering operation.

9 Claims, 8 Drawing Sheets

$$I_M = \frac{A}{1+D1*A}(I_{MS} - D1 \times I_N)$$

$$\omega c = \frac{1}{R\sqrt{C1 * C2}}$$

$$I_M = \frac{A}{1+D1*A} \{D2*I_{MS} + D2*I_{NO} - D1*I_N\}$$

(Prior art)

$$I_M = \frac{A}{1+A}(I_{MS} - I_N)$$

FIG.14

$$I_M = \frac{A}{1+A}(I_{MS} + I_{NO})$$

ELECTRIC POWER STEERING

BACKGROUND OF THE INVENTION

1. Field of the Invention

The present invention relates generally to an electric power steering in which steering power assist of an electric motor is directly to a vehicle steering system to reduce necessary steering power to be applied by a driver, and more particularly to such a power steering apparatus which is capable of effectively decreasing unwanted noises in a vehicle steering system so as to provide a highly improved response to driver's steering operations.

2. Description of the Related Art

Electric power steering apparatuses for use with an automotive vehicle have conventionally been known, which supply to an electric motor a target current generated on basis of operator-applied steering torque sensed by a steering torque sensor and vehicle velocity sensed by a vehicle velocity sensor, and drives the motor in accordance with the thus-obtained target current.

There have also been known electric power steering apparatuses which detect a deviation between a target current and a motor current actually flowing through such a motor and compensate for a phase delay and deviation in the control system via a proportional-plus-integral (PI) control or proportional-plus-integral-derivative (PID) control that performs control using the detected deviation.

Figure 9:
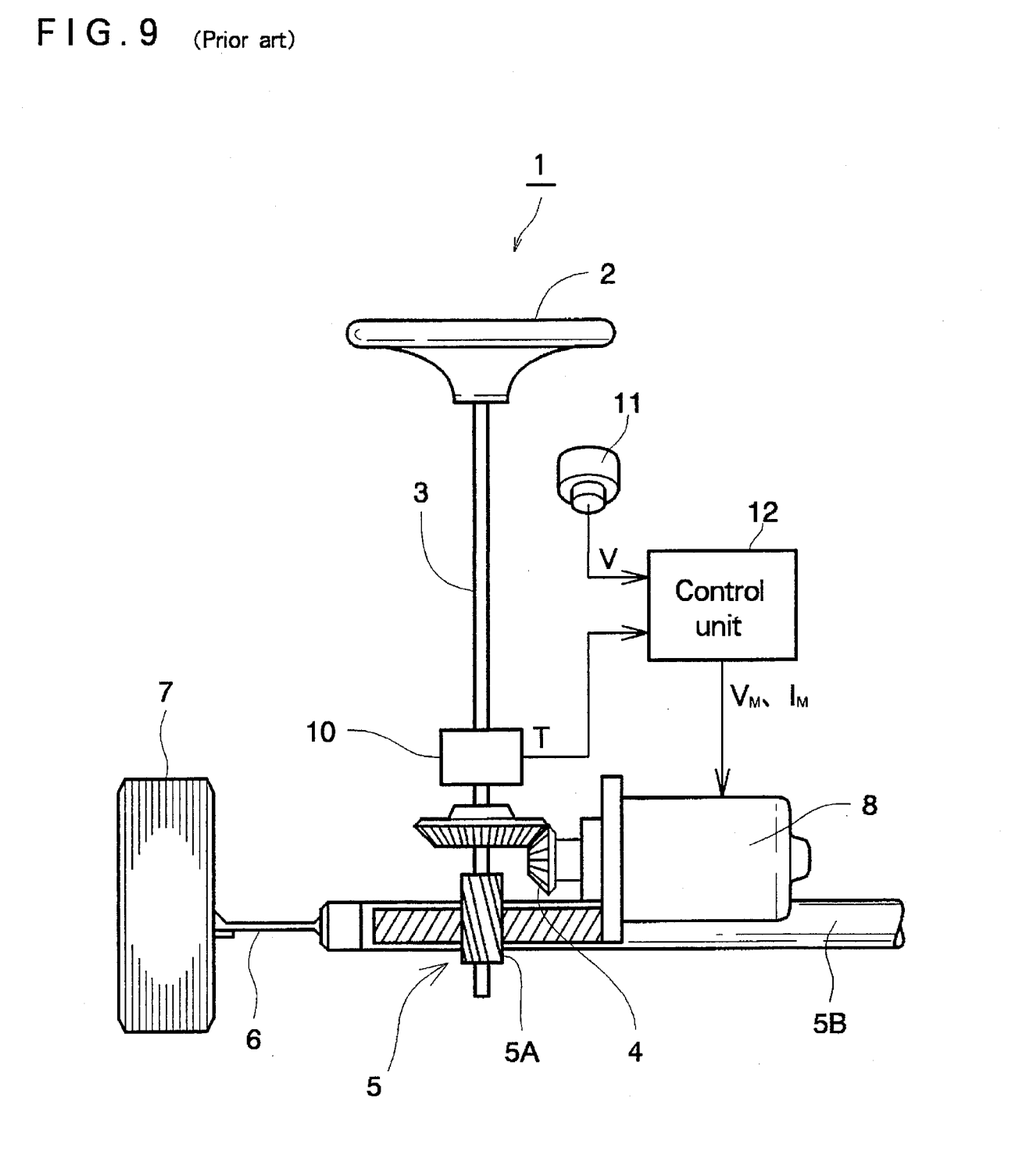
FIG. 9 is a schematic view showing the general structure of a typical example of a prior art electric power steering apparatus.
Figure 10:
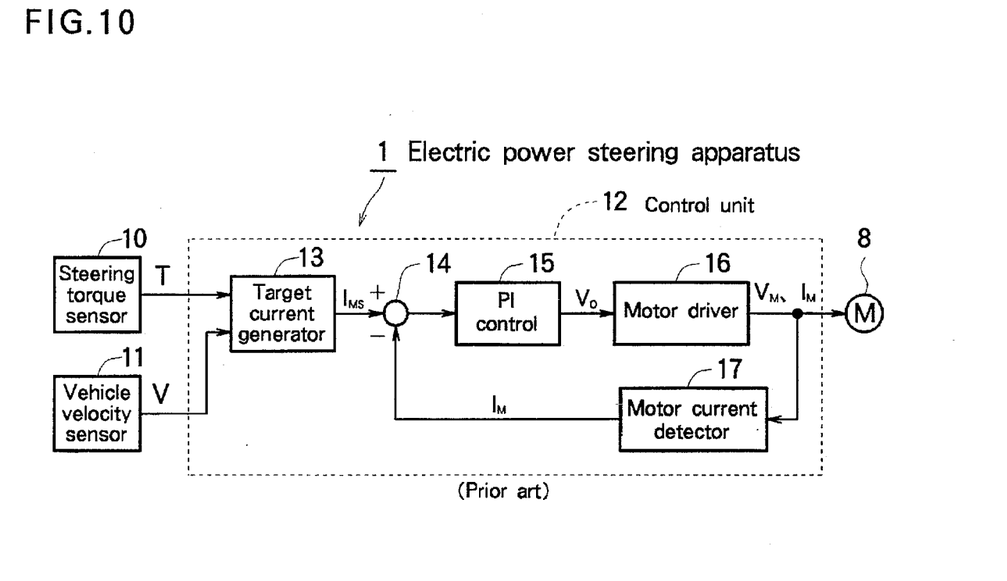
FIG. 10 is a block diagram showing the configuration of the principal part of the prior art electric power steering apparatus of FIG. 9.

FIG. 9 is a schematic representation of the general arrangement of a prior art electric power steering apparatus, and FIG. 10 is a block diagram showing the configuration of the principal part of the electric power steering apparatus shown in FIG. 9.

As shown in FIG. 9, the electric power steering apparatus 1 comprises a steering wheel 2, a steering shaft 3, a hypoid gear 4, a rack-and-pinion mechanism 5 composed of a pinion gear 5A and a toothed rack 5B, tie-rods (only one shown) 6, steerable front wheels (only one shown) 7, an electric motor 8 for generating a steering assist, a steering torque sensor 10 for sensing steering torque applied to the steering wheel 2 by the driver and outputting a steering torque signal T indicative of the sensed torque, a vehicle velocity sensor 11 for sensing vehicle velocity and outputting a vehicle velocity signal V indicative of the sensed velocity, and a control unit 12 for controlling the energization of the motor 8 on the basis of the steering torque signal T and vehicle velocity signal V.

As the steering wheel 2 is operated or turned by the driver, the steering torque sensor 10 operatively connected to the steering shaft 3 detects operator-applied steering torque to output a corresponding steering torque signal T, which will be supplied to the control unit 12.

The rotary motion of the steering wheel 2 is transferred via the steering shaft 3 to the pinion 5A, and the resultant rotation of the pinion 5A is converted into linear movement of the rack 5B, which in turn varies the steering direction of the steerable front wheels 7 via the tie-rods 6.

In the meantime, the vehicle velocity sensor 11 detects vehicle velocity to output a corresponding vehicle velocity signal V, which is supplied to the control unit 12.

On the basis of the steering torque signal T and vehicle velocity signal V, the control unit 12 generates motor voltage $V_M$ for supplying motor current $I_M$ to drive the motor 8. The motor 8 thus driven by the motor current $I_M$ provides a steering assist to the vehicle steering system via the hypoid gears 4 so as to permit substantial lessening of necessary steering power to be applied by the driver.

In FIG. 10, the control unit 12 of the electric power steering apparatus 1 includes a target current generator 13, a subtracter 14, a proportional-plus-integral (PI) control 15, a motor driver 16 and a motor current detector 17.

Figure 11:
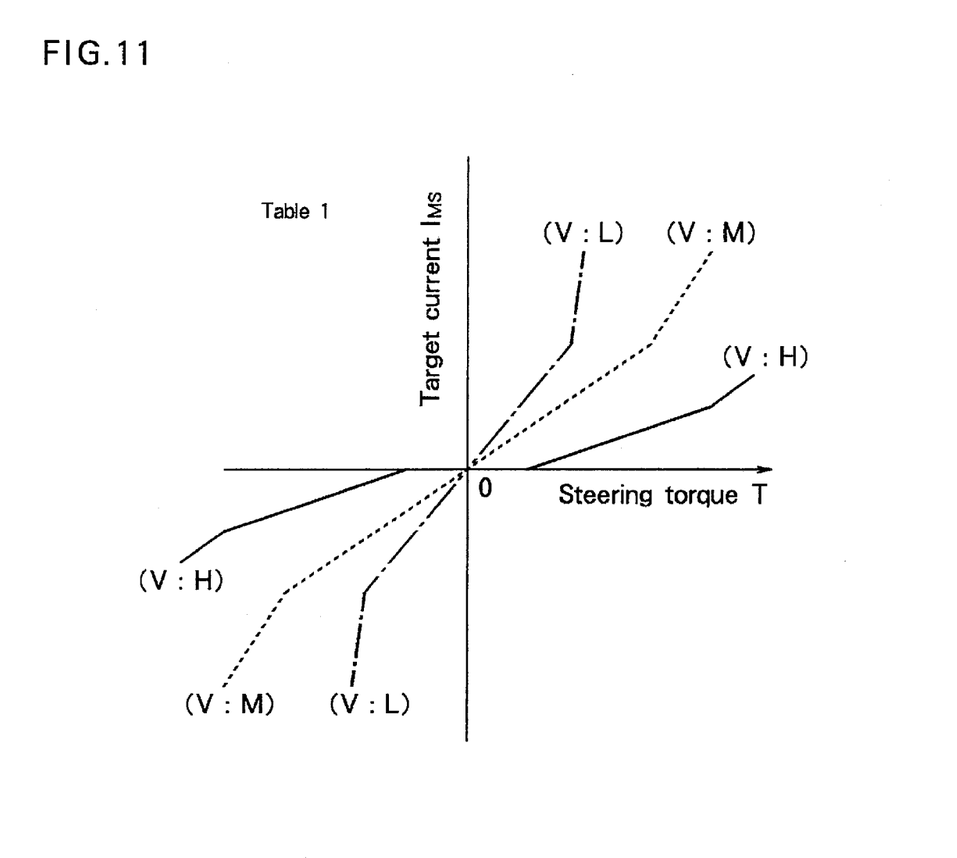
FIG. 11 is a graphic representation of a steering torque (T) - target current ($I_{MS}$) characteristic plotted with vehicle velocity signal V used as parameter (TABLE 1)

The target current generator 13 sets a target current $I_{MS}$ on the basis of the steering torque signal T and vehicle velocity signal V supplied from the sensors 10 and 11, by looking up a steering torque (T) - target current ($I_{MS}$) characteristic table (TABLE 1) which is plotted by use of vehicle velocity V as a parameter.

The subtracter 14 calculates a deviation $\Delta I_M$ between the target current $I_{MS}$ and the motor current $I_M$.

The PI control 15 operates to compensate for the deviation $\Delta I_M$ by performing PI control and thus generates a control signal Vo for controlling the energization of the motor driver 16.

The motor driver 16 generates motor voltage $V_M$ on the basis of the control signal Vo (e.g., phase width modulation (PWM) signal) so as to provide motor current $I_M$ to drive the motor 8.

The motor current detector 17 detects the motor current $I_M$ and feeds the detected current $I_M$ back to the minus (−) input of the subtracter 14 (NFB: Negative Feedback).

Figure 12:
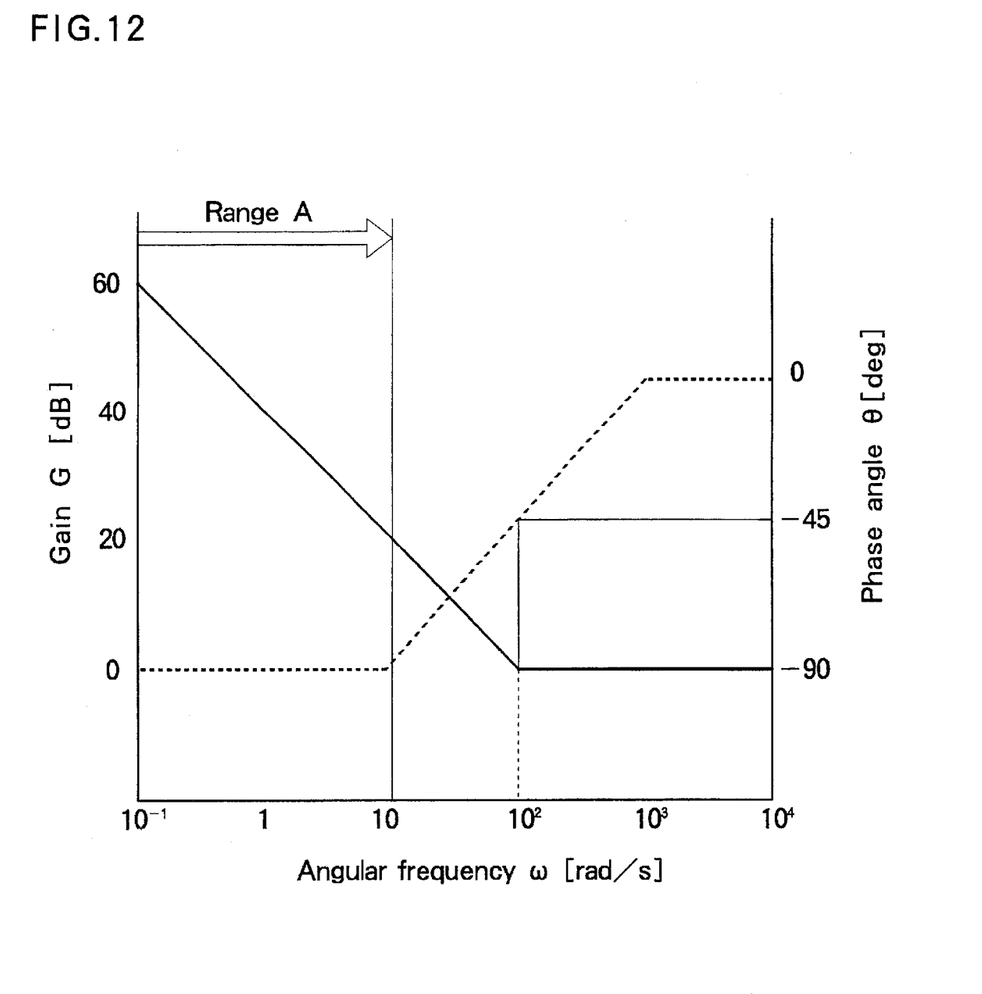
FIG. 12 is a Bode diagram of a proportional-plus-integral (PI) control.

The PI control 15 comprises proportional and integral elements connected in parallel configuration, and gain G and phase angle θ for transfer function F(jω) are represented in a Bode diagram of FIG. 12.

As seen from FIG. 12, in a region where the angular frequency ω corresponding to the steering rotation speed is relatively low, the gain G (=20 log G) denoted by solid line can be greatly improved although a phase delay (θ=−90°) occurs as denoted by broken line; in another region where the angular frequency ω is relatively high, the phase delay can be decreased to a substantial degree although the gain G is low.

However, despite the fact that the prior electric power steering apparatus 1 can enhance the gain G in the low angular frequency region and decrease the phase delay in the high angular frequency region as mentioned, the apparatus 1 has the problem that the PI or PID control is very susceptible to unwanted noise brought in from the outside.

Figure 13:
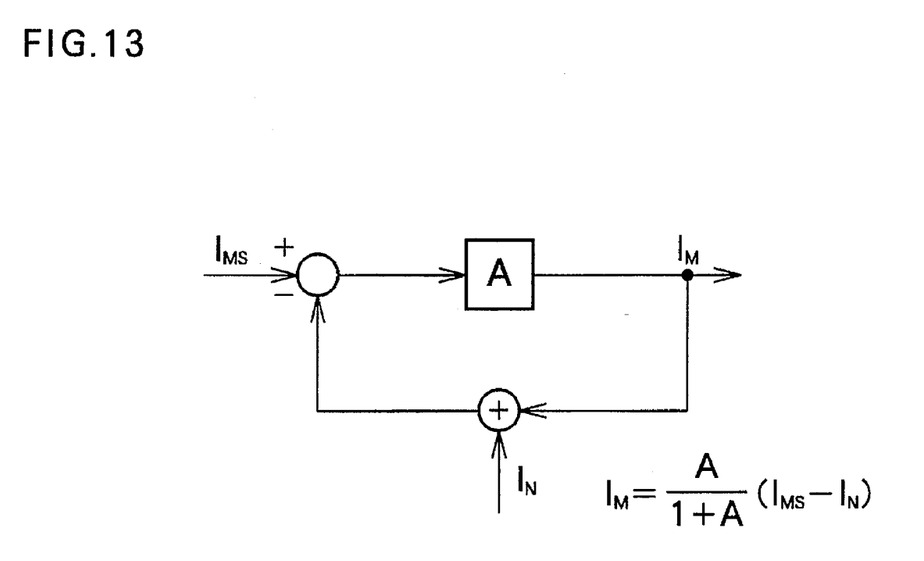
FIG. 13 is a block diagram illustrating an example where a noise source is present in the feedback loop of FIG. 10.
Figure 14:
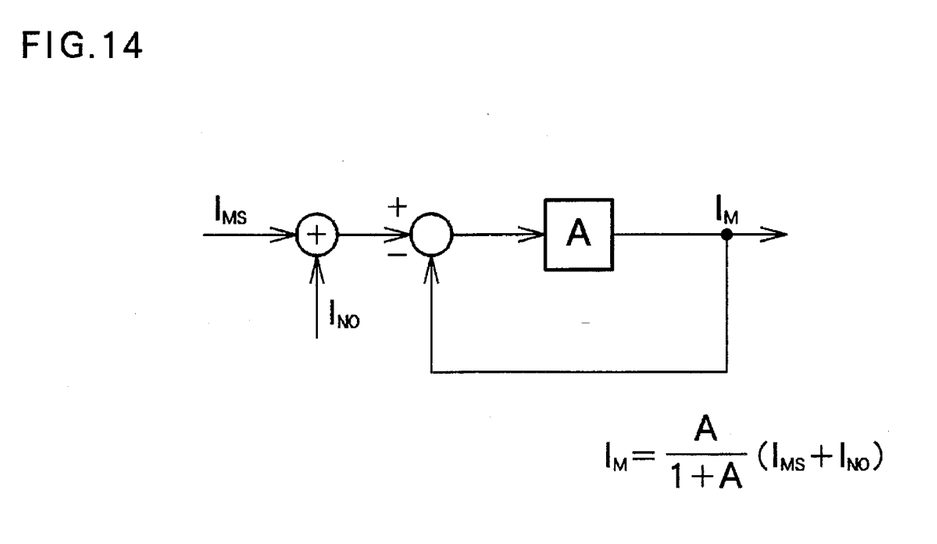
FIG. 14 is a block diagram illustrating another example where a noise source is present on the input side of the feedback loop of FIG. 10.

FIGS. 13 and 14 are block diagrams corresponding to the configuration of FIG. 10, showing examples where a noise source is included. More specifically, FIG. 13 is a block diagram showing an example where a noise source is present in the feedback loop of FIG. 10, while FIG. 14 is a block diagram showing another example where a noise source is present on the input side of the feedback loop of FIG. 10.

In FIGS. 13 and 14, reference character $I_{MS}$ denotes the target current, $I_{MS}$, $I_M$ the motor current, and $I_N$ and $I_{NO}$ noise currents. Further, reference character A denotes an equivalent circuit of the PI control 15 and motor 8, whose transfer function can be expressed as:

$$A = K_P * \{1 + 1/(T_I * s)\} * 1/R_M \qquad \text{[Equation 1]}$$

where s represents a Laplace operator, and $L_M \ll R_M$. Further, in Equation 1, $K_P$, $T_I$, $R_M$ and $L_M$ represent a proportional gain, integration time, inter-terminal equivalent resistance of the motor 8 and self-inductance of the motor 8, respectively.

Because the noise currents $I_N$ and $I_{NO}$ are generally of high frequency and hence the Laplace operator s is far greater than "1" (s≫1), Equation 1 may be simplified into Equation 2, which represents the transfer function only by simple gain factors as follows:

$$A = K_P/R_M \quad \text{[Equation 2]}$$

Assuming that noise current $I_N$ is brought into the feedback loop as illustrated in FIG. 13, the relationship among the motor current $I_M$, target current $I_{MS}$ and noise current $I_N$ may be expressed as:

$$I_M = (I_{MS} - I_N) * A/(1+A) \quad \text{[Equation 3]}$$

As clear from Equation 3, the rate of contribution to the motor current $I_M$ of the noise current $I_N$ equals that of the target current $I_{MS}$.

Thus, as the proportional gain A is increased in order to improve a response to the driver's steering operation, the noise components in the motor current $I_M$ increases so that the commercial quality of the steering apparatus may be damaged by increased adverse effects resulting from the noise components. Therefore, it is necessary to decrease the proportional gain A to lower the steering response of the apparatus.

Also, where noise current $I_N$ is brought in the target current $I_{MS}$ as illustrated in FIG. 14, the contribution to the motor current $I_M$ of the noise current $I_N$ equals that of the target current $I_{MS}$ as expressed in Equation 4 below. Thus, if the proportional gain A is increased in order to improve the steering response, the noise components in the motor current $I_M$ increases so that the commercial quality may be damaged by increased adverse effects resulting from the noise components, as in the case of FIG. 13. Therefore, it is necessary to decrease the proportional gain A to lower the steering response of the apparatus.

$$I_M = (I_{MS} + I_{NO}) * A/(1+A) \quad \text{[Equation 4]}$$

SUMMARY OF THE INVENTION

In order to solve the above-mentioned problems of the prior art, the present invention provides an electric power steering apparatus which supplies a steering power assist of an electric motor directly to an associated vehicle steering system, so as to reduce necessary steering power to be exerted by a driver. The steering apparatus includes an attenuation device in the form of a phase delay circuit or an active low-pass filter, which is provided in a feedback loop connecting a motor current detector and a control section of a control unit constituting the vehicle steering system. By the attenuation device attenuating relatively high frequency components of the motor current detected by the motor current detector, there is achieved a high-performance electric power steering apparatus which is capable of reducing noise in the feedback loop, without affecting the motor current, to a sufficient degree to highly improve a response to the driver's steering operation.

According to another aspect of the present invention, there is provided an electric power steering apparatus of the above-mentioned type, in which attenuation devices are provided both in the feedback loop connecting the motor current detector and the control section and in a path connecting the control section and the target current generator. The attenuation device attenuates relatively high frequency components both in the motor current detected by the motor current detector and in the target current output from the target current generator. Thus, the steering apparatus can reduce noises in the feedback loop and main control system without affecting the motor current and target current.

Because the attenuation means in the form of a phase delay circuit or an active low-pass filter is provided in the signal path of the control unit as mentioned above, the noise components can effectively be attenuated by a desired amount, and hence the present invention can achieve a high-performance electric power steering apparatus which provides an improved steering response.

DETAILED DESCRIPTION

Figure 1:
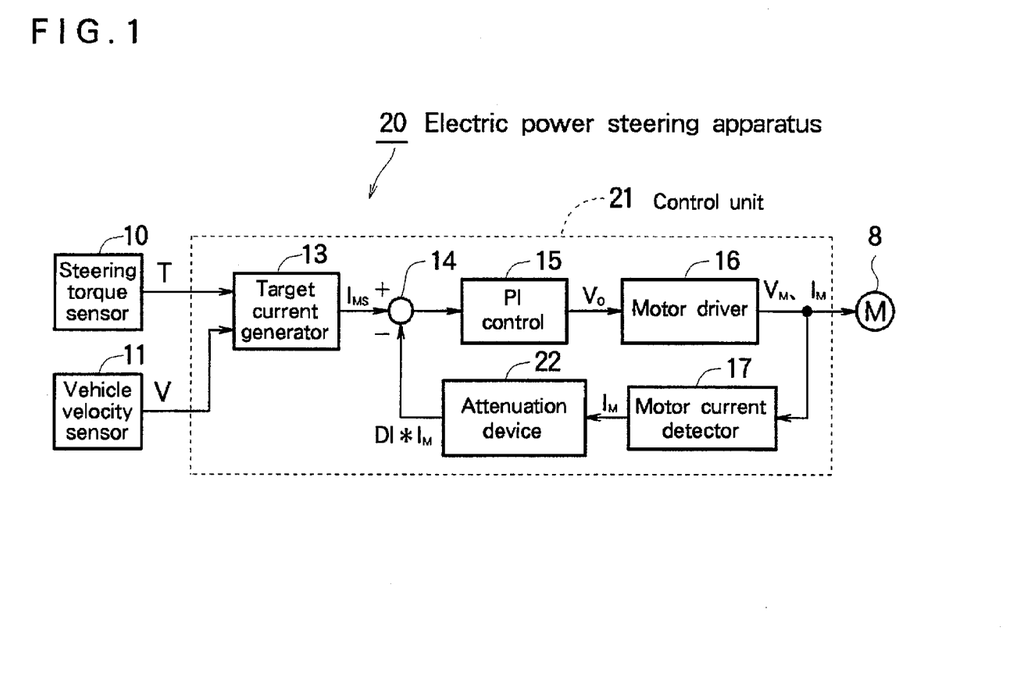
FIG. 1 is a block diagram showing the configuration of the principal part of an electric power steering control system according to one embodiment of the present invention.
Figure 2:
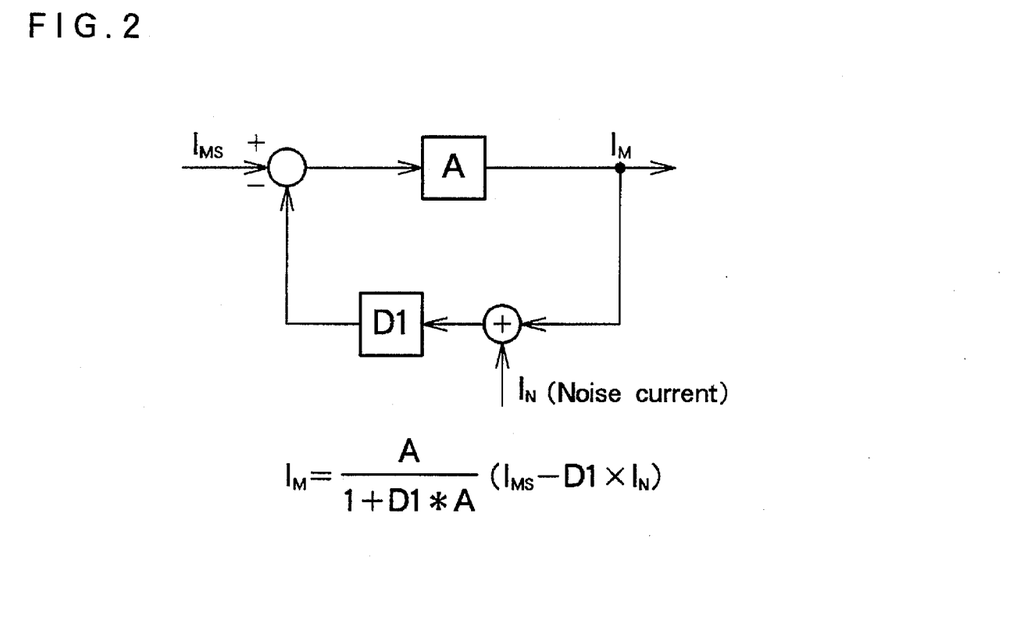
FIG. 2 is a block diagram explanatory of the operation of the power steering control system of FIG. 1.

FIG. 1 is a block diagram showing the configuration of the principal part of an electric power steering control system according to one embodiment of the present invention, and FIG. 2 is a block diagram illustrating the operation of the power steering control system of FIG. 1.

The electric power steering apparatus 20 shown in FIG. 1 is basically different from the prior art electric power steering apparatus 1 of FIG. 10 in that it includes a control unit 21 including an attenuation device 22.

The attenuation device 22 is provided in a feedback loop connecting a motor current detector 17 and a PI control 15 and arranged in such a manner to primarily attenuate noise current $I_N$ brought into the feedback loop (see FIG. 2).

The attenuation device 22 comprises either a phase delay circuit or an active low-pass filter and is constructed so as to achieve a desired amount of attenuation above a predetermined value of frequency such as a zero-point angular frequency $\omega_o$ or cutoff angular frequency $\omega_c$.

Noise brought in the control unit 21 of the electric power steering apparatus 20 is, in general, of frequency sufficiently higher than motor current $I_M$ generated by a motor driver 16 using pulse-width modulation (PWM) control. Thus, by setting to a sufficiently high value the zero-point frequency fo ($=\omega_o/2\pi$) or cutoff frequency fc ($=\omega_c/2\pi$) of the phase delay circuit or active low-pass filter constituting the attenuation device 22, the noise can be attenuated by a desired amount without affecting necessary frequency components of the motor current $I_M$.

The block diagram of the control system in FIG. 2 shows a case where noise (noise current $I_N$) is brought into the motor current $I_M$ in the feedback loop ($I_M+I_N$). If supplied to a subtracter 14 via the attenuation device 22 having an attenuation ratio of D1 (D1<1: attenuation amount 20 log D1), the motor current $I_M$ of Equation 3 can be represented as:

$$I_M=(I_{MS}-D1 * I_N) * A/(1+D1 * A) \qquad \text{[Equation 5]}$$

Because, as previously mentioned, the attenuation ratio D1 is a value for a band sufficiently higher than the frequency components of the necessary motor current $I_M$, it is possible to attenuate only the noise current $I_N$ by the amount of D1*A/(1+D1*A) and to maintain the target current $I_{MS}$ at N(1+A) with no attenuation.

Further, even where the motor current $I_M$ and noise current $I_N$ are substantially equal in frequency, the contribution to the motor current $I_M$ of the noise current $I_N$ can be made smaller than that of the target current $I_{MS}$ by an amount corresponding to the attenuation ratio D1 on the basis of Equation 5.

Figure 3:
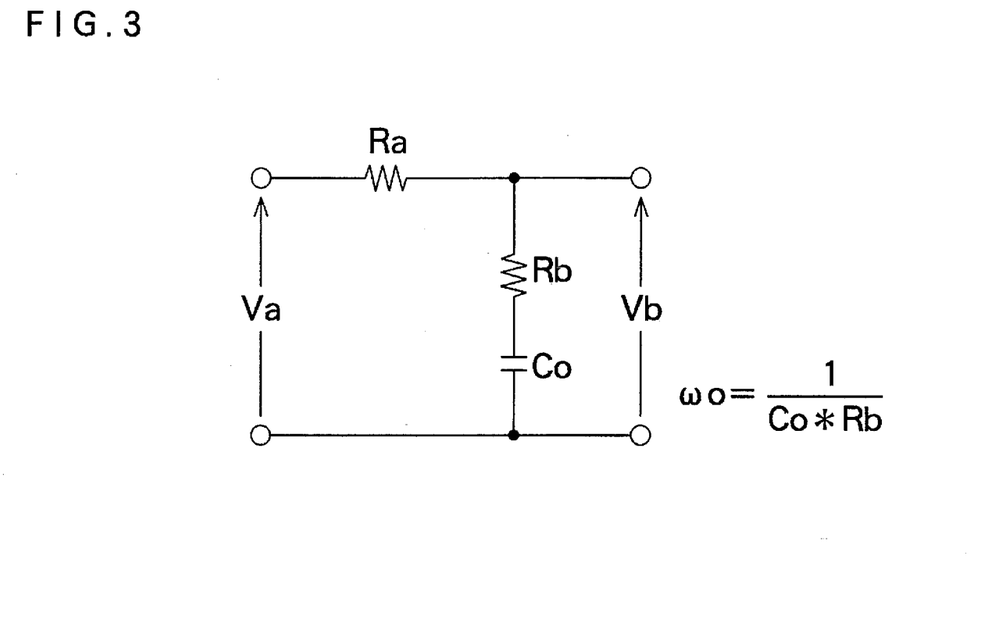
FIG. 3 shows an embodiment where the power steering control system includes an attenuation device in the form of a phase delay circuit.
Figure 4:
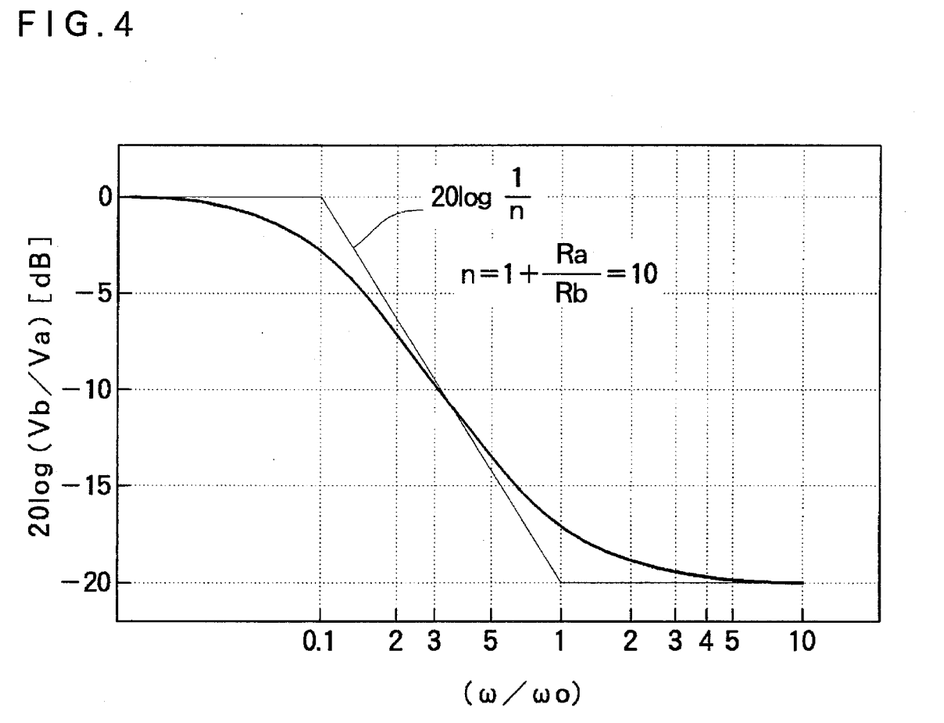
FIG. 4 is a graphic representation of a transfer function - frequency characteristic presented in the embodiment of FIG. 3.

FIG. 3 shows an embodiment where the attenuation device of the electric power steering apparatus is implemented by a phase delay circuit, while FIG. 4 shows a transfer function - frequency characteristic presented in the embodiment of FIG. 3.

In FIGS. 3 and 4, the phase delay circuit is comprised of resistors Ra and Rb and a condenser Co, and the zero-point angular frequency $\omega_o$ of the delay circuit is determined by the reciprocal of the product of Rb and Co, while the attenuation amount 20 log (Vb/Na) is determined by a value corresponding to the ratio (1/n) of Rb to Ra.

By, for example, setting the value n to "10" and also selecting the resistor Rb and condenser Co such that the zero-point angular frequency $\omega_o$ is lower than the frequency of the noise current $I_N$ in question, the level of the noise current $I_N$ can be attenuated by 20 dB for a band higher than the zero-point angular frequency $\omega_o$.

Figure 5:
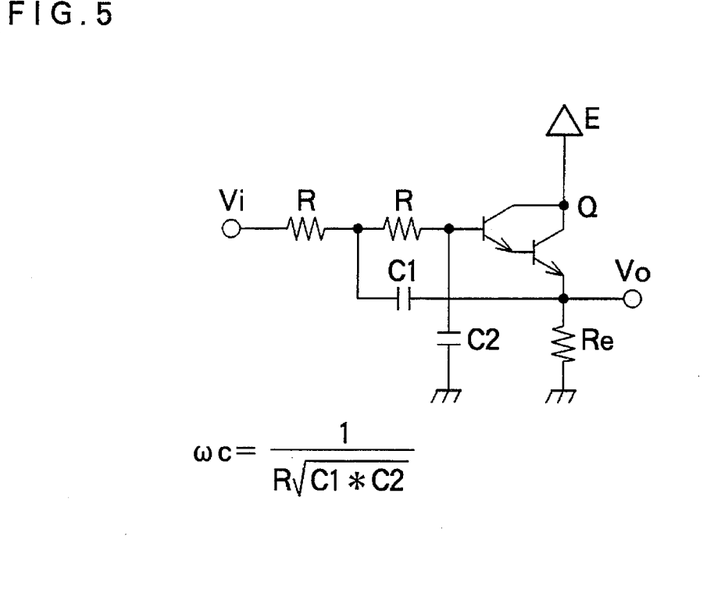
FIG. 5 shows another embodiment where the attenuation device of the power steering control system is implement by an active low-pass filter.
Figure 6:
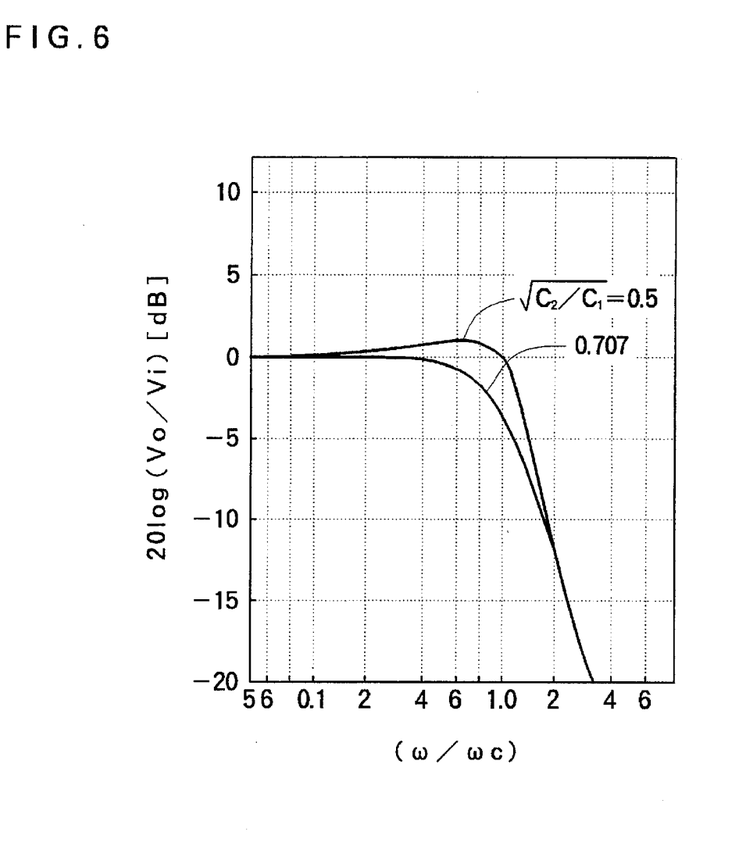
FIG. 6 is a graphic representation of a transfer function - frequency characteristic presented in the embodiment of FIG. 5.

FIG. 5 shows another embodiment where the attenuation device of the power steering apparatus is implement by an active low-pass filter, and FIG. 6 is a graphic representation of a transfer function - frequency characteristic presented in the embodiment of FIG. 5.

In FIGS. 5 and 6, the active low-pass filter is a second-order CR active low-pass filter. If two resistors R are set to have a same resistance value, the cutoff angular frequency $\omega_c$ of the filter is determined by the reciprocal of the product of resistors R and the square root of the product of condensers C1 and C2 $\{\sqrt{(C1*C2)}\}$, and the attenuation amount 20 log (Vo/Vi) presents such a characteristic as to decrease by 12 dB per octave at frequencies higher than the cutoff angular frequency $\omega_c$, so that it is allowed to reduce the level of the noise current $I_N$ to a sufficient degree.

Further, by selecting a value of the square root of the ratio of condenser C1 to condenser C2 $\{\sqrt{(C1/C2)}\}$, the cutoff characteristic can be set to a desired value, and the low-pass filter can be constructed so as not to affect the frequency characteristic of the necessary motor current $I_M$.

The above-mentioned use of the phase delay circuit or active low-pass filter for the attenuation device can reduce the level of the noise current $I_N$ to a sufficient degree and lessen adverse effects on the vehicle steering system due to the noise current $I_N$.

Although the embodiment has been described above in connection with a case where the attenuation amounts of the phase delay circuit and active low-pass filter are 20 dB and 12 dB, respectively, these attenuation amounts may be set to any other values as needed.

Figure 7:
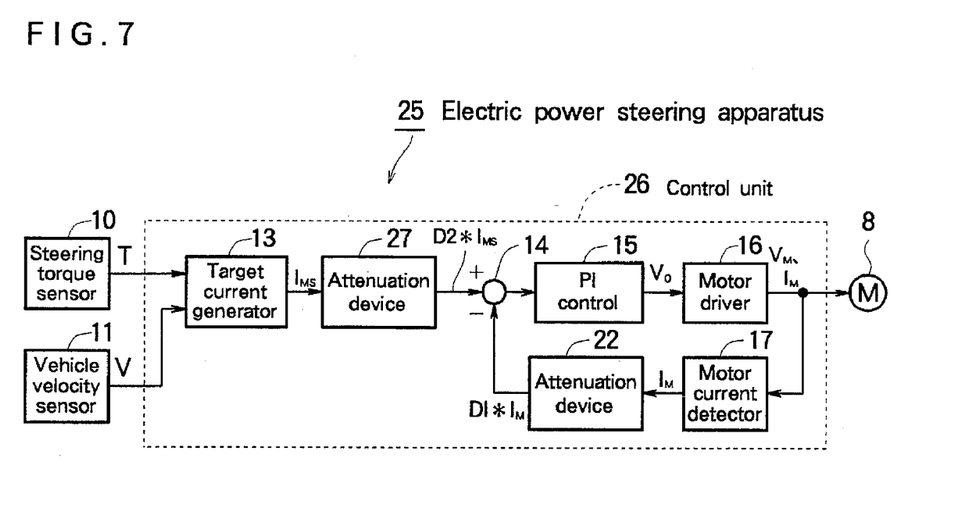
FIG. 7 is a block diagram showing the configuration of the principal part of an electric power steering control system according to another embodiment of the present invention.
Figure 8:
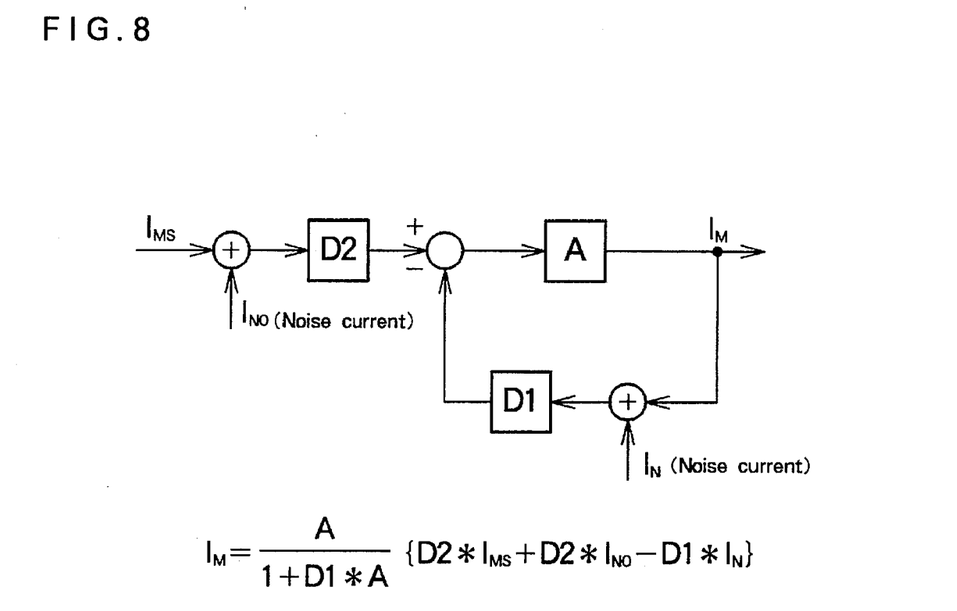
FIG. 8 is a block diagram explanatory of the operation of the power steering control system of FIG. 7.

FIG. 7 is a block diagram showing the configuration of the principal part of an electric power steering control system according to another embodiment of the present invention, and FIG. 8 is a block diagram illustrating the operation of the power steering control system of FIG. 7.

The electric power steering apparatus 25 shown in FIG. 7 is different from the power steering apparatus 20 of FIG. 1 in that its control unit 26 includes an attenuation device 27 in addition to the attenuation device 22.

The attenuation device 27 in this embodiment is provided in a signal path connecting the target current generator 13 and the PI control 15 and constructed in such a manner to attenuate noise current $I_{NO}$ brought in target current $I_{MS}$.

Similarly to the attenuation device 22 as described in relation to FIG. 1, the attenuation device 27 comprises either a phase delay circuit as shown in FIG. 3 or a second-order CR active low-pass filter as shown in FIG. 5.

The block diagram of the control system in FIG. 8 shows a case where noise current $I_{NO}$ is brought in the target current $I_{MS}$ ($I_{MS}+I_{NO}$) and noise current $I_N$ is brought in motor current $I_M$ in the feedback loop ($I_M+I_N$).

The noise current $I_{NO}$ is supplied to the subtracter 14 via the attenuation device 27 having an attenuation ratio of D2 (D2<1: attenuation amount 20 log D2), and the noise current $I_N$ is supplied to the subtracter 14 via the attenuation device 22 having an attenuation ratio D1 (D1<1: attenuation amount 20 log D2). Thus, the motor current $I_M$ of Equation 5 can be represented as:

$$I_M=X * A/(1+D1 * A) \qquad \text{[Equation 6]}$$

where X=(D2 * $I_{MS}$+D2 * $I_{NO}$−D1 * $I_N$)

Because the attenuation ratios D1 and D2 are values for a band sufficiently higher than the frequency component of the motor current $I_M$, it is possible to only attenuate the noise current $I_N$ by the amount of D1*N(1+D1*A) and noise current $I_{NO}$ by the amount of D2*N(1+D1*A) and to maintain the target current $I_{MS}$ at A/(1+A) with no attenuation.

Because the control unit 26 is provided with the attenuation devices 22 and 27 as mentioned, the electric power steering apparatus 25 of FIG. 7 can reduce the level of the noise current $I_N$ in the motor current $I_M$ flowing in the feedback loop and of the noise current $I_{NO}$ in the target current $I_{MS}$, and can also provide an improved response to the steering operation by the driver.

As has been described so far in conjunction with the preferred embodiments, the present invention is characterized by the provision of an attenuation device in a signal path connecting the motor current detector and control section. With this feature, the invention can attenuate noise components of relatively high frequency in the path without affecting motor current, and hence can substantially enhance a response to the driver's steering operation while effectively lessening adverse effects on the vehicle steering system due to the noise brought in the path.

Further, because the attenuation means is implemented by a phase delay circuit or an active low-pass filter and thus that the noise components can be attenuated by a desired amount, the present invention can reduce noise in the vehicle steering system to a substantially degree.

Furthermore, by virtue of the arrangement that such attenuation devices are provided both in the signal path connecting the control section and motor current detector and in the signal path connecting the control section and target current generator so as to reduce noises brought in via the respective paths, the present invention can provide an even more improved response to the steering operation while lessening adverse effects on the vehicle steering system to a substantial degree.

Because it is possible to sufficiently reduce the influence of noise, the present invention can achieve a high-performance electric power steering apparatus which provides an improved response to the driver's steering operation.

What is claimed is:

1. An electric power steering apparatus comprising:

a steering torque sensor for sensing steering torque applied to a steering system;

a motor for providing a steering power assist to the steering system;

target current setting means for determining a target current of said motor on the basis of a steering torque signal output from said steering torque sensor;

motor current detecting means for detecting a motor current flowing through said motor;

control means for controlling energization of said motor on the basis of a deviation between the target current and the motor current, said control means including at least proportional and integral elements, and attenuation means provided in a path connecting said motor current detecting means and said control means.

2. An electric power steering apparatus as defined in claim 1 wherein said attenuation means comprises a phase delay circuit.

3. An electric power steering apparatus as defined in claim 1 wherein said attenuation means comprises an active low-pass filter.

4. The electric power steering apparatus as defined in claim 1, wherein said control means controls energization of said motor on the basis of a deviation between the target current and motor current attenuated by said attenuation means.

5. The electric power steering apparatus as defined in claim 1, wherein said attenuation means is provided in a feedback loop from said motor current detecting means to a subtracter provided in said control means.

6. An electric power steering apparatus comprising:

a steering torque sensor for sensing steering torque applied to a steering system;

a motor for providing a steering power assist to the steering system;

target current setting means for determining a target current of said motor on the basis of a steering torque signal output from said steering torque sensor;

motor current detecting means for detecting a motor current flowing through said motor;

control means for controlling energization of said motor on the basis of a deviation between the target current and the motor current, said control means including at least proportional and integral elements, and attenuation means provided in a path connecting said motor current detecting means and said control means and in a path connecting said control means and said target current setting means.

7. An electric power steering apparatus as defined in claim 6 wherein said attenuation means comprises either a phase delay circuit or an active low-pass filter, or a combination thereof.

8. The electric power steering apparatus as defined in claim 7, wherein said control means controls energization of said motor on the basis of a deviation between the target current and motor current attenuated by said attenuation means.

9. The electric power steering apparatus as defined in claim 7, wherein said attenuation means is provided in a feedback loop from said motor current detecting means to a subtracter provided in said control means.

\* \* \* \* \*